United States Patent [19]

Cour

[11] Patent Number: 4,488,836
[45] Date of Patent: Dec. 18, 1984

[54] METHOD AND APPARATUS FOR EMBEDDING A PIPE IN A TRENCH IN WEAK GROUND

[76] Inventor: François R. Cour, 34 Avenue Francois Mansart, Maisons-Laffitte, Yvelines, France

[21] Appl. No.: 430,758

[22] Filed: Sep. 30, 1982

[30] Foreign Application Priority Data

Oct. 14, 1981 [FR] France .................... 81 19335

[51] Int. Cl.³ ............................................ F16L 1/04
[52] U.S. Cl. .................................. 405/159; 405/156; 405/157
[58] Field of Search ............... 405/36, 156, 157, 159, 405/161

[56] References Cited

U.S. PATENT DOCUMENTS

| | | | |
|---|---|---|---|
| 2,738,745 | 3/1956 | Harpold | 405/157 |
| 3,699,690 | 10/1972 | Watter | 405/157 |
| 4,068,488 | 1/1978 | Ball | 405/157 |
| 4,348,135 | 9/1982 | St. Clair | 405/36 |

FOREIGN PATENT DOCUMENTS

| | | | |
|---|---|---|---|
| 2369387 | 5/1978 | France . | |
| 85728 | 6/1980 | Japan | 405/157 |
| 1235790 | 6/1971 | United Kingdom . | |
| 2015115 | 9/1979 | United Kingdom . | |
| 855318 | 8/1981 | U.S.S.R. | 405/157 |

Primary Examiner—David H. Corbin
Attorney, Agent, or Firm—Christel, Bean & Linihan

[57] ABSTRACT

A trench is dug under the pipe. A collapsible means formed by a supple and deformable envelope is conveyed into the trench as it is dug in a state folded or coiled upon itself. The envelope is filled with water by a pump assembly and unfolded in a diverging cone, and progressively substituted for materials extracted as the trench is dug. The pipe is then lowered into and positioned in the trench by the escape of water out of the envelope through orifices or valves.

25 Claims, 14 Drawing Figures

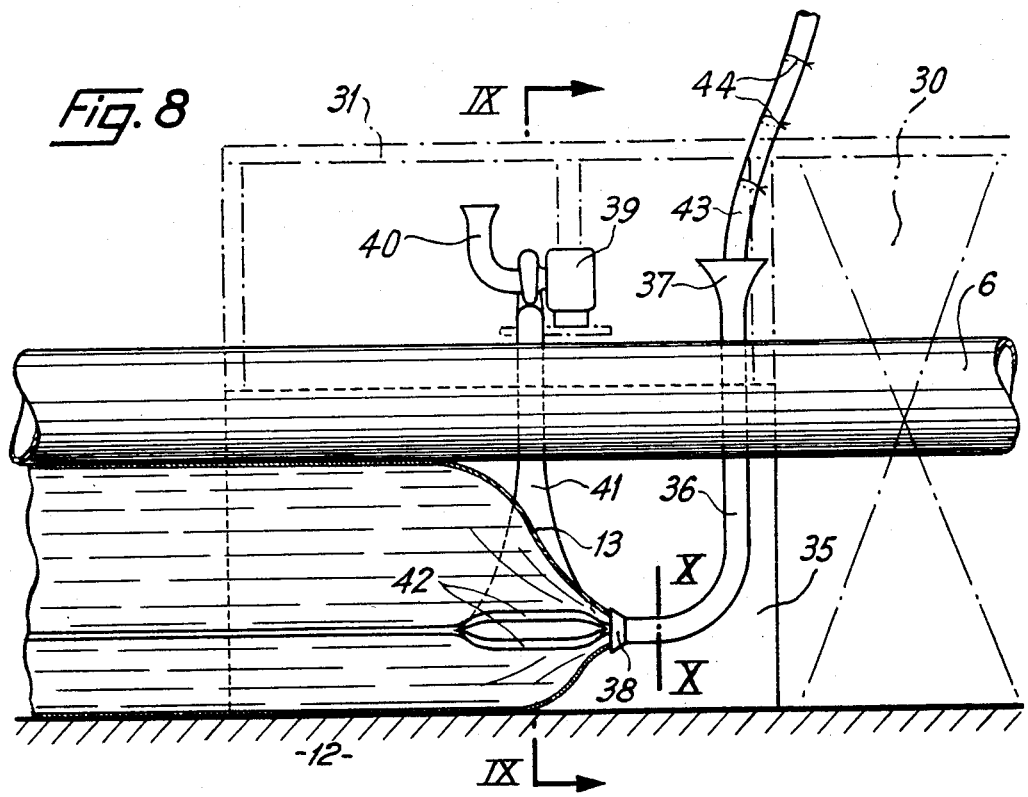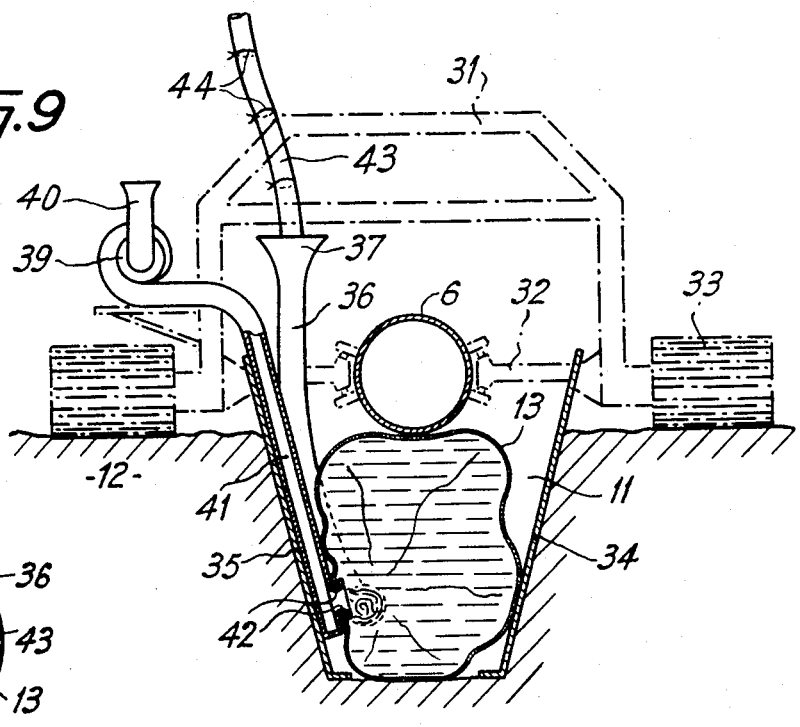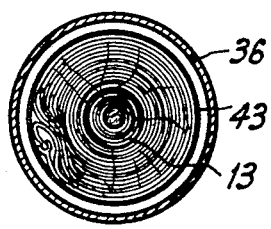

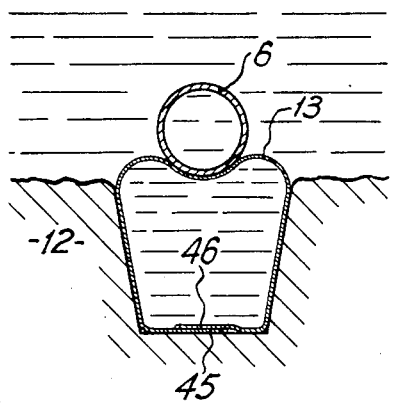
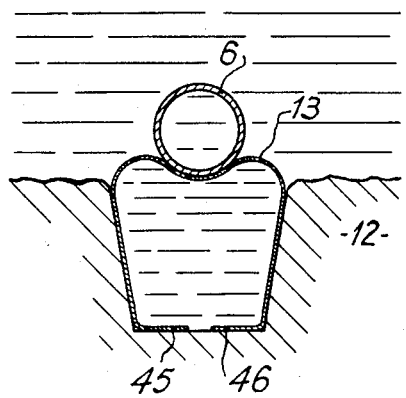
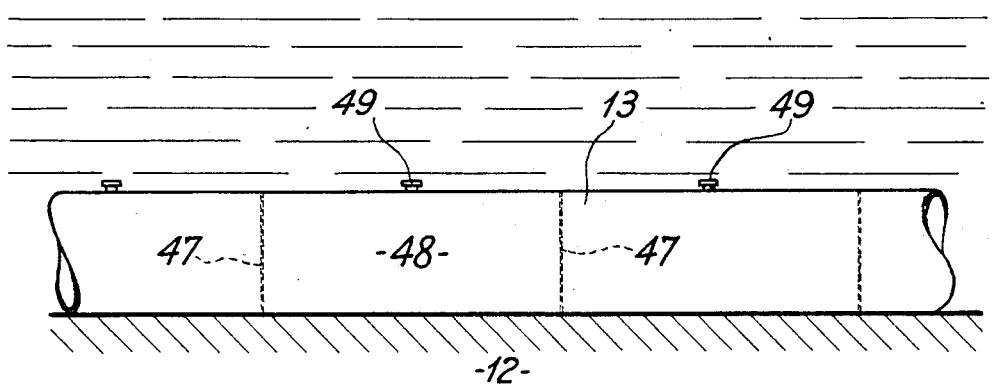
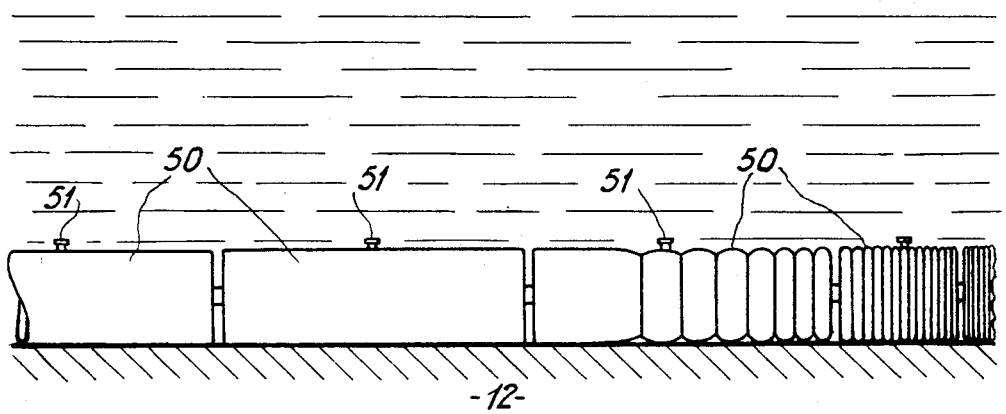

METHOD AND APPARATUS FOR EMBEDDING A PIPE IN A TRENCH IN WEAK GROUND

BACKGROUND OF THE INVENTION

The invention relates to a method and apparatus for temporarily retaining the lateral walls of a trench, after the latter has been dug in ground which is especially, but not exclusively, an underwater bed consisting of materials having poor cohesion, such as sands, silts, muds or clays, in order to allow a pipe, which is preferably substantially rigid, such as an oil pipe or a pipeline having a large diameter, and which comprises an internal metal wall enclosed, if necessary, by a protective concrete sheath, to be laid in the trench.

To protect pipes, and especially oil pipes or pipelines, from the harmful effects of underwater currents or from the swell of the sea, and also to prevent marine anchors or trawl nets for fishing from hooking onto these pipes, attempts have been made for many years to embed these pipes in underwater beds. This has been carried out by placing these pipes in trenches dug in the underwater beds. Experience has shown that it is very difficult, indeed virtually impossible, in the present state of the art, to place an oil pipe in a trench previously dug in an underwater bed. In contrast, numerous devices, both mechanical and hydraulic, have been developed to allow a trench to be dug under a pipe previously placed on the underwater bed, the pipe coming to rest, by bending under the effect of its own weight, on the bottom of the trench at a certain distance behind a device for digging the trench, which device is moved along under the pipe.

Amongst the mechanical means developed for this purpose are some with which the material forming the underwater bed under the pipe can be dredged or cut away.

It is also known to move under the pipe a plough having a ploughshare which pushes back the material of the underwater bed laterally to both sides relative to the direction of advance of the plough. Furthermore, the hydraulic devices used for the same purpose permit a hydraulic cutting away of the underwater bed under the pipe using, for example, a plurality of nozzles for ejecting a liquid, such as water, at a low quantity discharge rate but at high pressure, the nozzles being supported by a metal gantry which is moved on the pipe.

Although the use of these different known devices and methods sometimes achieve good results when the underwater bed consists of materials sufficiently cohesive that a trench having vertical walls, approximately vertical walls or, at least, steeply inclined walls, is sure to be stable, the same does not apply when the underwater bed is sandy, muddy or consists of any other material that is pulverulent or has inadequate cohesion, because the lateral walls of the trench may collapse and the trench may fill in, at least partially, before the pipe is suitably positioned on the original base of the trench.

In the latter case, when using the above-mentioned devices, in order to prevent the immediate, or almost immediate, filling in of the trench a depression or valley of great size has to be made in the underwater bed. On the one hand, that makes it necessary to move very great volumes of material and, on the other hand, it does not achieve the desired protection for the pipe unless the depression is filled in on either side of the pipe and, if necessary, above the pipe, once the pipe is in place on the bottom of the depression, by replacing a major portion of the materials removed when digging, which substantially increases the cost of the operation.

Attempts have also already been made to tow behind the digging device cofferings or formers having two rigid sides for temporarily supporting the lateral walls of the trench. In order, however, to allow the walls to collapse only after the descent and positioning of the pipe in the trench, these sides must extend over a very great distance and, for this reason, it is very difficult, if not impossible, to move them.

To overcome these various disadvantages, it has already been proposed to embed a pipe, such as an oil pipe or pipeline, in an underwater bed consisting especially of materials having poor cohesion by applying under this pipe the method for digging trenches known by the terms "mud" trenches or trenches "having moulded walls", which method comprises replacing the materials extracted from the trench being dug by mud as the trench advances, so that the mud constantly exerts sufficient pressure on the lateral walls of the trench, which walls are approximately vertical or steeply inclined, that these walls do not collapse before the pipe is positioned on the bottom of the trench, the general term "mud" designating any of those wellknown media which are obtained by mixing, for example, argillaceous materials and anti-flocculants, such as those marketed under the name Bentonite, or other thixotropic products and which remain constantly deformable and have only poor cohesion.

The method for embedding a pipe in an underwater bed which is the subject of that proposal consists, therefore, in laying the pipe on the underwater bed, then digging a trench under the pipe and replacing the materials removed from the trench which is being dug by mud, as the trench advances, in such a manner that the lateral walls of the trench are prevented from collapsing, and, finally, in the pipe's positioning itself on the bottom of the trench.

If the underwater bed is argillaceous, it is advantageous, according to that proposal, that the argillaceous materials removed while the trench is being dug are filtered and, in a mixing device which is moved together with the moving arrangement involved in forming the "mud" trench, are suitably treated in such a manner that these argillaceous materials are mixed with anti-flocculants and then re-injected into the trench in the form of mud, this recycling of materials removed from the underwater bed making possible considerable savings in the amount of mud that must be conveyed to the site.

It is also proposed that the materials removed should be mixed in the trench and that water and anti-flocculants should be added in situ in such a manner, that the mud filling the trench is produced directly in the latter.

It should be noted, however, that the use of these economical methods is only possible provided that the underwater bed consists of clays having appropriate physicochemical properties, which is not always the case. Furthermore, the mechanical means to be provided in order that the materials available on the site can be re-used are costly and delicate to operate so that it appears preferable to convey to the site, in every case, the required quantities of, for example, Bentonite which is used in association with the liquid medium available on the site.

Under these conditions, very large quantities of dry products have to be moved, which is a further not substancial disadvantage.

This disadvantage is also encountered when the method of "mud" trenches or trenches "having moulded walls" is used on a land site to ensure that the lateral walls of trenches dug in an emerging soil are retained.

SUMMARY OF THE INVENTION

According to the present invention, it is proposed to overcome the above-mentioned disadvantages by means of a method which replaces those methods used hitherto both on underwater beds and on emerging soils.

For this purpose, the method according to the invention is characterised in that it comprises substituting collapsible wall-supporting means for materials removed from the trench as the trench is dug, in such a manner that this means, by its presence or by the pressure it exerts on the lateral walls of the trench, prevents the walls from collapsing, and then reducing the volume of this means to allow the descent and positioning of the pipe in the trench and to allow the lateral walls to collapse and, if necessary, the trench to fill up.

Preferably, the method also comprises moving, as the trench advances, means for temporarily supporting the lateral walls of the trench which prevent the walls from collapsing before the collapsible means has been placed in the trench.

These means for temporarily supporting the lateral walls of the trench can be moved either behind the means, of any of the types mentioned above, for digging the trench, or on both sides of, and under, the digging means, in such a manner that the trench can be dug between the said support means.

In a preferred embodiment, the method according to the invention comprises using, as the collapsible means, an expansible member placed in its contracted or compressed state into the trench, which member is expanded between the two lateral walls of the trench to prevent them from collapsing.

According to the invention, there may be used, as the expansible member, an envelope consisting of a supple and deformable substance which is conveyed progressively into the trench in a state folded or coiled upon itself and is then filled with a liquid at a pressure which is at least equal to the hydrostatic pressure at the level of the trench.

If the size of the pipe allows it, that is to say, if the apparent density of the pipe which, in that case, is filled with water is sufficiently high, the pipe may position itself in the trench, the volume of the collapsible means being reduced by the effect of the pipe's own weight.

If that is not the case, the method according to the invention comprises, additionally, producing a flow of escaping liquid out of the envelope to control the reduction in volume of the collapsible means.

If the method according to the invention is used on an underwater bed, it is advantageous to use the liquid available in the surrounding medium as liquid for filling the envelope.

The invention relates also to an apparatus for temporarily retaining the lateral walls of a trench to implement the method according to the invention, which apparatus comprises a device for substituting collapsible wall supporting means for materials removed from the trench as it is dug and also, if necessary, a device for controlling the reduction in volume of the collapsible means when this is not brought about by the weight of the pipe itself, the substitution device and any necessary device for controlling the reduction in volume of the member preferably being moved together with the device used for digging the trench.

Preferably, the retaining device according to the invention comprises also a device for temporarily supporting the lateral walls of the trench, which device is in the form of a former, caisson or coffering having at least two rigid sides which are moved at the same time as the digging device parallel to each other and each one parallel to one lateral wall of the trench, which they prevent from collapsing, and between which the substituting device ensures the positioning of the collapsible means in the trench.

In a preferred embodiment, the substituting device comprises a device for expanding an expansible member placed in contracted or compressed state in the trench by a conveying device, the expansion device itself comprising a diverging cone at the entrance of which the expansible member is in compressed or contracted state.

The expansion device may also comprises a device for pumping and injecting a fluid under pressure into the expansible member, when that is formed by an envelope which is made of a supple and deformable substance and is conveyed progressively from a reserve into the trench, in a state folded or coiled upon itself, by the conveying device, the reserve preferably being moved at the same time as the conveying device, the expansion device, the digging device, and, if they are present, the device for controlling the decrease in volume of the member and the device for temporarily supporting the lateral walls of the trench.

In the latter case, it is advantageous that the device for pumping and injecting the fluid under pressure opens out into The diverging cone and co-operates with the latter to ensure the transition of the envelope from the state of being folded or coiled upon itself to the unfolded state against the walls of the trench.

To prevent any untimely unfolding of the envelope, the latter is preferably held in the folded or coiled state in breakable ligatures or in a breakable sheath which are broken in the expansion device.

Furthermore, to ensure that accidental tearing of the envelope filled with fluid under pressure does not prevent all further use of the method according to the invention a device for transverse pinching of the envelope is provided at the exit of the expansion device.

In a first embodiment, the envelope is in the form of a sleeve having a substantially cylindrical cross-section in the unfolded state.

If desired, an envelope of this type may be segmented into longitudinal compartments.

In a second embodiment, the envelope is in the form of a series of bellows, compressed longitudinally in a state folded upon themselves and conveyed in a string into the expansion device and into the trench where they are unfolded one after the other.

In these two cases, the device for pumping and injecting is able to supply feed the envelope centrally.

In a third embodiment, the envelope may be in the form of an elongate strip stored in the reserve with its two lateral edges adjacent or superposed, the expansion device comprising at least two diverging lips which ensure that the lateral edges of the strip are separated and between which the device for pumping and injecting opens out.

The envelope may, however, also be in the form of an elongate strip stored in the reserve with its two lateral edges interlocked if necessary by an interlocking device, for example of the glider type, which allows them to be released, the expansion device comprising a device for opening the belt provided with at least two diverging lips which ensure the separation of the edges of the opening and between which the device for pumping and injecting opens out, the opening device likewise comprising, if necessary, means for controlling the release of the lateral edges interlocked by the interlocking device.

In these latter two cases, it is advantageous that the expansion device also comprises at least two converging lips which ensure that the edges separated by the diverging lips are brought together or superposed facing one wall of the trench against which they are pressed by the pressure of the fluid injected.

In another embodiment, relevant to the latter two cases mentioned above, the expansion device also comprises a device for interlocking the edges previously separated by the diverging lips, if necessary after they have been brought together by converging lips.

With regard to decreasing the volume of the collapsible means when that takes the form of an envelope that can be filled with a liquid under pressure, the invention provides, in a first embodiment, free orifices distributed regularly along the envelope which allow a flow of fluid under pressure escaping from the envelope.

In a second embodiment, if the envelope is in segmented form produced by a string of bellows, it can be provided with at least one valve having an opening controlled at each compartment or at each bellows section for releasing a flow of escaping liquid under pressure out of the envelope.

BRIEF DESCRIPTION OF THE DRAWINGS

FIG. 8 is a fragmentary schematic view in longitudinal cross-section of a second embodiment of an apparatus according to the invention;

FIGS. 9 and 10 are schematic views in cross-section along the lines IX—IX and X—X, respectively of FIG. 8;

FIGS. 11 and 12 are fragmentary views in transverse cross-section of alternative embodiments of the invention; and FIGS. 13 and 14 are schematic views in longitudinal cross-section of embodiments of the collapsible means of two forms of apparatus according to the invention.

DETAILED DESCRIPTION OF THE INVENTION

Figure 1:
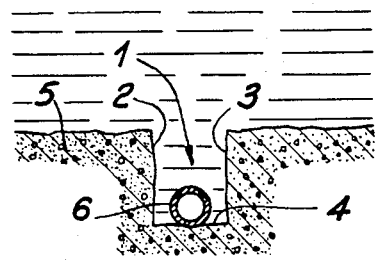
FIGS. 1 and 2 are schematic views in transverse cross-section of a pipe or pipeline placed at the bottom of a trench, dug in an underwater bed having good and poor adhesion, respectively, after using the known methods of embedding.

With reference to FIG. 1, a trench 1, having approximately vertical lateral walls 2 and 3, has been dug by a known mechanical digging device, of a type allowing cutting or dredging, or by a plough having a ploughshare, or alternatively by a known hydraulic device of a type having nozzles ejecting water under high pressure with which there is associated, if necessary, a device for extracting the materials displaced by the digging device, in an underwater bed 5 which consists of materials having good cohesion, and a pipeline 6 is positioned on the bottom 4 of the trench. This form of embedding is achieved by using the known methods mentioned above.

Figure 2:
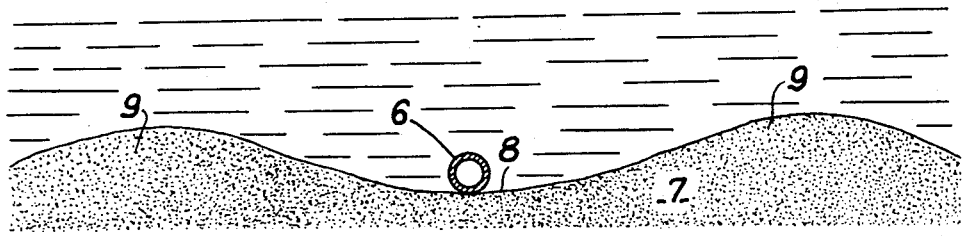

FIG. 2 shows the result obtained after using, on an underwater bed 7 which consists of materials having poor cohesion, such as sand, the methods and devices which were suitable for the positioning of the pipeline 6 on the bottom of a trench 1 having vertical lateral walls 2 and 3 in an underwater bed 5 having good cohesion, as shown in FIG. 1.

In FIG. 2, the pipeline 6 rests on the bottom of a depression 8 of great width bordered on its two sides by mounds 9 of materials from the underwater bed 7 which have been moved. It can be seen that even at the cost of moving very large volumes of materials and, therefore, at the cost of a large consumption of energy, satisfactory protection of the pipeline 6 is not ensured unless the materials forming the mounds 9 are moved back to fill the depression 8 on both sides of the pipeline 6 and, if necessary, above the latter, which would considerably increase the duration of the embedding work, virtually double the volumes to be moved and the energy consumed and, as a result, give rise to much greater costs.

Figure 3:
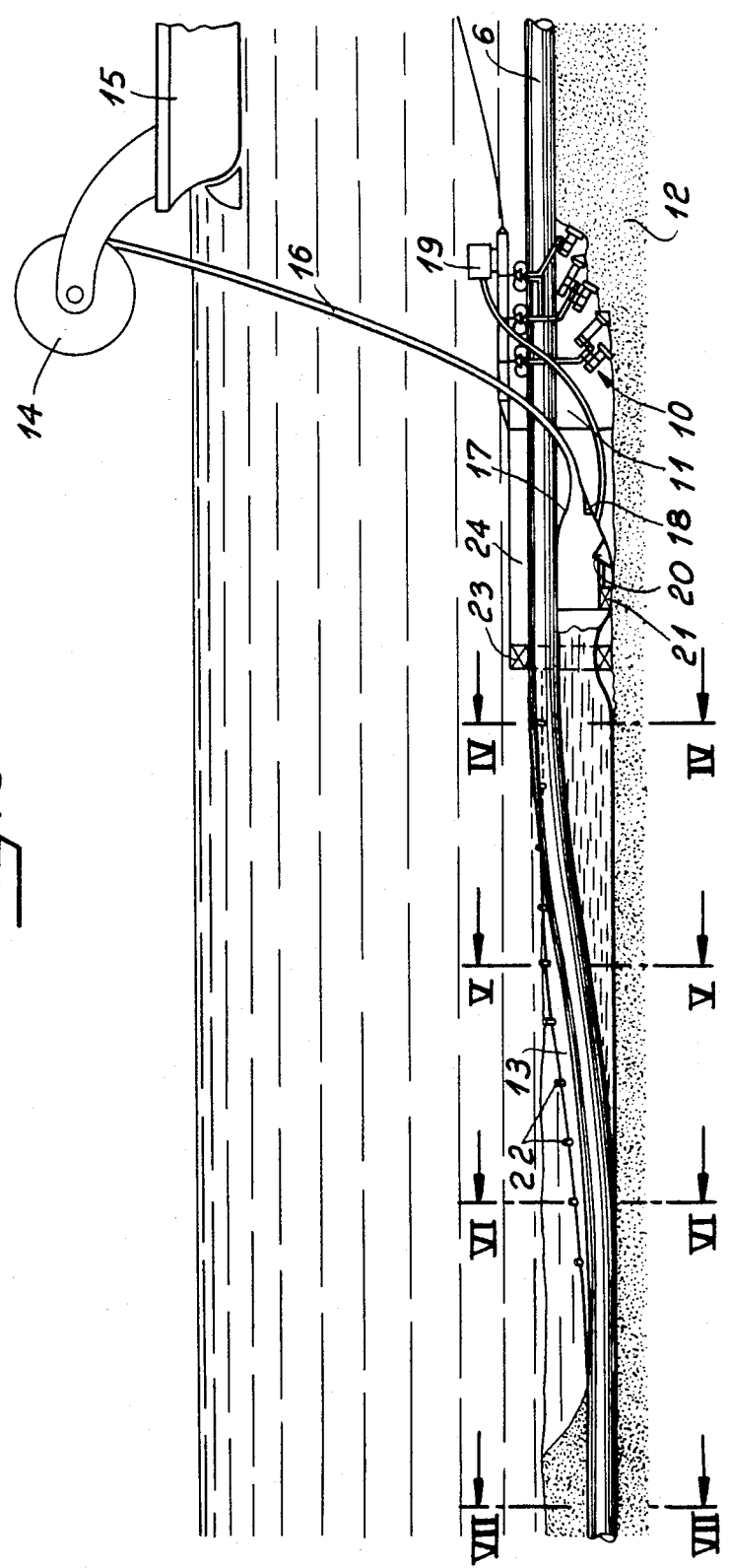
FIG. 3 is a fragmentary schematic view in longitudinal cross-section of a trench, the lateral walls of which are retained by a method, and by means of apparatus, in accordance with the invention.

In FIG. 3, there is shown schematically, as an example, a digging device 10 used for digging a trench 11 under the pipeline 6 previously placed on an underwater bed 12 having poor or average cohesion. Obviously, the digging device used may be either mechanical or hydraulic and of any of the known types mentioned above which are used for this purpose at present in association with a device (not shown) for extracting materials removed when the trench 11 is being dug. The digging device 10 and the extracting device are moved as a whole along the pipeline 6 and, as the trench advances, an envelope 13 made from a supple and deformable material is conveyed into the trench 11 where it is filled with water from the surrounding aquatic medium in order to fill the whole internal volume of the trench 11, the envelope being substituted for the materials resulting from the digging of the trench which have been extracted.

The envelope 13 is in the form of an elongate strip, the width of which corresponds approximately to the perimeter of the trench 11 and the lateral edges of which have parts cooperating with a closing device having a glider. The envelope 13 was previously coiled upon itself after having been folded along its lateral centreline in such a manner that the parts co-operating with the closing device having a glider are adjacent at the exterior of the roll formed in this manner without being in a state of co-operation, that is to say, without the lateral edges of the belt being interlocked with each other. In the form of a cord, the envelope 13 is then stored rolled up on a reserve roll 14, which is mounted so that it can rotate on a surface support 15 and from which the envelope is unrolled and conveyed in a guiding sheath 16 to the entrance to a spreader 17 which is located behind the digging device 10 and the exit of which is turned away from the working face of the trench.

Shortly after entering the spreader 17, the adjacent lateral edges of the belt are separated from each other by a deflecting device 18 comprising at least one diverging lip downstream of which there opens out, in the wall of the spreader 17, the outlet orifice of a pumping and injecting assembly 19 having a large flow capacity which is suitable and of known type and is supported by the chassis of the digging device 10 which is pulled by a surface support which can be the same support 15 carrying the reserve roll 14. The assembly 19 pumps water from the surrounding medium and injects it between the two separated lateral edges of the envelope 13 in such a manner that the envelope unfolds and is pressed against the wall of the spreader 17. Simultaneously with the unfolding of the envelope 13 in the spreader 17, the lateral edges of the envelope 13 are brought towards each other by a device 20 having converging lips which pulls a slider 21 ensuring the interlocking of the two parts co-operating with the closing device, in such a manner that, behind the expansion device formed by the diverger 17 and the pumping and injecting assembly 19, the envelope 13 is in the form of a continuous sleeve or sausage filled with water under slight overpressure with respect to the hydrostatic pressure at the trench 11, the volume of which is filled in this manner so that the envelope 13, which may not be very thick, is pressed with sufficient pressure against the lateral walls of the trench 11 that they cannot collapse.

In this manner, a trench 11 is formed having approximately vertical lateral walls or lateral walls very slightly inclined from the vertical which are moulded by the presence in the trench 11 of the compressible or coercible member which is formed by the envelope 13 filled with water.

Figure 4:
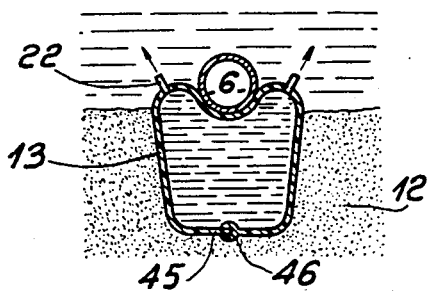
FIGS. 4, 5, 6 and 7 are schematic views in transverse cross-section along the lines IV—IV, V—V, VI—VI and VII—VII, respectively, of FIG. 3.

It should be noted that, owing to the weight of the pipeline 6 itself and its natural flexibility, the latter rests on the upper part of the unfolded envelope 13 a short distance behind the moving arrangement comprising the digging device 10 and the extraction device, the pumping and injecting assembly 19 and the spreader 17 pulling the slider 21, which helps to put the envelope 13 under slight overpressure relative to the surrounding medium, as is shown in FIG. 4.

Figure 5:
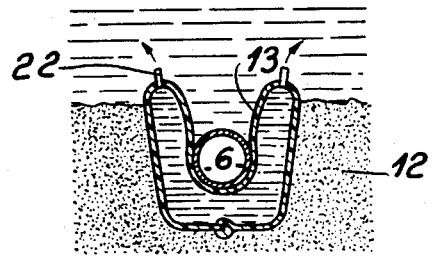
Figure 6:
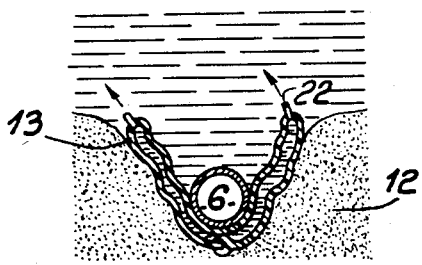
Figure 7:
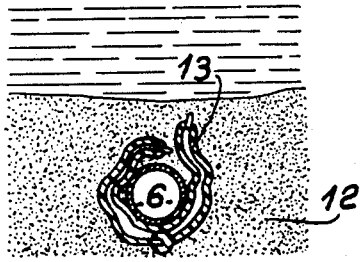

Free orifices which are defined by small openings 22, provided with channels, if necessary, are distributed regularly along the envelope 13, and occupy an upper position on the envelope when it is unfolded, allow an escape flow to the surrounding liquid medium. In this manner, under the combined effect of its weight and natural flexibility, the pipeline 6 which, in this case, is filled with water so that its apparent relative density is generally equal to or greater than 1.4 ensures that the envelope 13 is compressed and that its volume decreases, the decrease in volume being greater, the greater is the distance separating the point considered from the expansion device, as is shown in FIGS. 4, 5 and 6. The pipeline 6 thus descends progressivley into the trench 11 in which it positions itself on the envelope 13 which is virtually emptied of water, as shown in FIG. 6. This lowering of the pipeline 6 into the trench 11 under the effect of its own weight has the advantage that strains on the pipeline 6 are reduced and the maximum strains are less than the maximum permissible strains. The trench 11 can then be filled in by suitable means of known type, but this result can also be obtained by the effect of the swell of the sea or by underwater currents in such a manner that the embedded pipeline 6 is suitably protected.

If the pipeline 6 has a large diameter and, therefore, its apparent weight when it is full of water is great, it is not necessary for apertures such as 22 to be provided in the envelope 13 to allow an escape flow permitting the decrease in volume of the envelope. The decrease in volume is obtained owing to the great apparent weight of the pipeline 6 which, when it descends into the trench 11, pushes a certain volume of water in front of it towards the working face of the trench 11, which facilitates the unfolding and filling of the envelope 13 at the expansion device, in such a manner that the pumping and injecting assembly 19 is only required to supply a supplementary flow.

If the envelope 13 stored on the reserve roll 14 is in the form of a sleeve which is folded or coiled upon itself and is conveyed to the entrance of the spreader 17 by the guiding sheath 16, the spreader 17 is then equipped with a deflecting device 18 provided with a cutting blade which cuts the envelope along one of its generators, the two edges of the cut then being separated by the diverging lip(s) of the deflecting device 18, then, after passing the pumping and injecting assembly 19, they are brought together and superposed over an adequate width by the device having converging lips 20 in order that they can be interlocked with each other, for example by a soldering device which replaces the slider 21 of the example previously described.

To prevent the results of an accidental tear or rupture of the unfolded envelope 13 extending to parts of the envelope in the process of being unfolded or soon to be unfolded, a device 23 for transverse segmentation of the envelope 13 is provided behind the slider 21 or the interlocking device provided at the exit of the spreader 17.

This device 23 for transverse segmentation may be in the form of a device for transverse pinching, for example having a diaphragm, associated with an automatic tying machine which binds a throttled portion of the envelope 13 so that it is approximately water-tight. A device of that type can be used at regular intervals and not only in the case of a tear in the envelope 13, in such a manner that the latter has the appearance of a series of compressible sausages.

Reliably to prevent the lateral walls of the trench 11 from collapsing before the envelope 13 has been adequately substituted for the materials removed in such a manner that a suitable pressure is applied to the lateral walls of the trench 11, a device 24 for temporarily supporting the lateral walls of this trench 11 comprising, for example, a caisson, coffering or former having at least two rigid flat sides moved parallel to each other and each parallel to a lateral wall of the trench 11, can be pulled along the pipeline 6 and under the latter together with the digging device 10, the extraction device and the pumping and injecting assembly 19. The temporary support device 24 is pulled directly behind the digging device 10 if the underwater bed 12 has average cohesion. In contrast, if the bed has poor cohesion, the temporary support device 24 is moved in the underwater bed 12 under the pipeline 6 in such a manner that its flat sides cut the underwater bed 12 on both sides of the pipeline 6 while advancing along the latter, and the digging device 10 is moved behind the temporary support device 24 in such a manner that the trench is dug between the rigid flat sides of the temporary support device 24, the envelope 13 being introduced into and unfolded in the trench 11 between these two same sides. Under these conditions, the spreader 17 as well as the device for transverse segmentation 23 are both supported by the temporary support device 24 and moved with the latter and also with the digging device 10.

With reference to FIGS. 8 to 10, a further embodiment of the device according to the invention comprises a digging device 30 of any known suitable type which is supported by a chassis 31 shown by dotted lines and is moved, while being guided along the pipeline 6 by magnetic grippers supported at the ends of transverse arms 32, by means of caterpillar tracks 33 resting on both sides of the dug trench 11. The chassis 31 also supports, behind the digging device 30, a device for temporarily supporting the lateral walls of the trench 11 comprising two rigid sides 34 and 35 which are substantially flat and are folded at their lower part so that they press against the bottom of the trench 11. Finally, a conveying pipe 36 and a pumping assembly 39 having a large flow capacity are also supported by the chassis 31 behind the digging device 30. The conveying pipe 36, which is bent and provided with a vertical collecting head 37 having the shape of a truncated cone and with a horizontal diffuser 38 which is also in the form of a truncated cone and opens out at the side away from the digging device 30, extends approximately along the rigid side 35. This conveying pipe 36 guides the envelope 13 in a folded or coiled state, in such a manner that the two lateral edges of the belt consisting of supple material are adjacent, superposed or interlocked at the exterior of the cord formed in this manner, towards the exit of the injection horn 41 of the assembly 39 drawing water from the surrounding medium through its feed pipe 40. The injection horn 41 has the shape of a flattened funnel, extending along the rigid side 35 on the inside of the trench 11, and its exit, opening out towards the inside of the trench 11, is bounded by two lateral flanges 42 rolled back on themselves and having, at the side towards the diffuser 38, the shape of two diverging lips and, at the other side, that of two converging lips to ensure the separation and then the bringing together, respectively, and, if necessary, the interlocking, of the two lateral edges of the envelope 13, in such a manner that the injection horn 41 opens out between these two separated edges to ensure the unfolding, filling and pressurising of the envelope 13 in the trench 11 between the rigid sides 34 and 35 and under the pipeline 6.

To prevent an untimely unfolding of the envelope 13 before it has entered the guide pipe 36, the folded or coiled envelope is placed in a breakable sheath 43 or is retained in regularly spaced breakable ligatures 44, this sheath 43 and/or these ligatures 44 being broken in the conveying pipe 36 to allow the edges of the envelope 13 to be separated.

Owing to the slight overpressure in the unfolded envelope 13, the edges 45, 46 of the latter can be pressed against one of the walls or against the bottom of the trench 11, either simply adjacent or slightly superposed, as shown in FIGS. 11 and 12, if it is not considered necessary to interlock them with each other, as shown schematically in FIGS. 4 to 7.

It should be noted that the shape of the envelope 13 is not limited to the shape of a compressible sausage which can be filled via a central feed but that, as shown in FIG. 13, transverse walls 47 may be provided in the envelope 13, forming longitudinal compartments each of which is provided with an overpressure valve 49 or a valve 49 having controlled opening.

If the envelope 13 is in the form of an elongate strip, stored in the reserve 14 with its two lateral edges, such as 45 and 46, interlocked by a closing device having a glider, the expansion device may comprise an opening slider, ensuring the release of the lateral edges, subsequently separated by any suitable device, and also a closing slider ensuring the interlocking of the lateral edges after they have been brought together by any suitable device lying downstream of the mouth of the pumping and injecting assembly so that the two sliders fulfilling, one after the other, opposite functions make it possible to obtain an envelope 13 which is unfolded, filled and closed from an envelope which is folded, empty and closed.

Instead of using an envelope 13 which is folded transversely and coiled upon itself, it is also possible to use an envelope which is folded longitudinally upon itself in the manner of an accordion. As shown in FIG. 14, the envelope can then be in the form of a series of cylindrical portions 50 each of which is stored folded and compressed longitudinally upon itself, and each of which is conveyed in compressed state into the trench where they are unfolded, each cylindrical portion 50 being provided with a valve 51 allowing the escape flow for positioning the pipe in the trench. The cylindrical portions 50 of the envelope may be in strings, if necessary fed from cassettes. It should be noted that the method and the retaining device according to the invention are advantageously associated with a method and a device, respectively, of any suitable known type for digging a trench, to form a method and a device for embedding pipes on both "offshore" and "land" sites, the method according to the invention advantageously replacing, in the latter case, the "mud" trench method, especially for trenches of relatively small depth.

While preferred embodiments of the invention have been described, it should be understood that the invention is not limited thereto and is determined solely by the scope of the appended claims.

I claim:

1. A method of embedding a pipe in ground consisting of materials having poor cohesion, comprising the steps of: continuously digging a trench having lateral walls progressively lengthwise under said pipe, replacing materials removed from said trench by continuously delivered collapsible wall-supporting means in the entire trench, in such a manner that said collapsible wall-supporting means applies pressure against said lateral walls of said trench to prevent said walls from collapsing, and then continuously reducing the volume of said collapsible wall-supporting means to allow the descent and positioning of said pipe in said trench and to allow said lateral walls of said trench to collapse, at a point remote from the delivering point of said collapsible wall supporting means.

2. A method according to claim 1, which comprises moving along said trench, as said trench is dug, means for temporarily supporting said lateral walls of said trench to prevent said walls from collapsing before said collapsible wall-supporting means has been placed in said trench.

3. A method according to claim 1, wherein said collapsible means comprises an expansible member, the method comprising placing said expansible member in the trench in its contracted state and causing said member to increase in volume between said two lateral walls of said trench to prevent them from collapsing.

4. A method according to claim 3, which comprises using, as said expansible member, an envelope made of a supple and deformable substance, conveying said envelope progressively into said trench while folded or coiled upon itself and then filling said envelope with liquid at a pressure which is at least equal to the ambient hydrostatic pressure at the level of said trench.

5. A method according to claim 1, wherein said pipe positions itself in said trench, its own weight reducing the volume of said collapsible means.

6. A method according to claim 4, further comprising producing a flow of liquid escaping from said envelope to control the reduction in volume of said collapsible means.

7. A method according to claim 4, used on an underwater bed, which comprises using the liquid available in the surrounding medium as liquid for filling said envelope.

8. Apparatus embedding a pipe in a trench having lateral walls in ground consisting of materials having poor cohesion, which appartus comprises a device for delivering continuously collapsible wall-supporting means for replacing materials removed from said trench to prevent the lateral walls of said trench from collapsing, means for maintaining said collapsible means in expanded state for filling entirely the trench, and means for collapsing said wall supporting means at a point remote from the delivering point.

9. Apparatus as claimed in claim 8, which includes a trench-digging device.

10. Apparatus according to claim 9, which comprises means for temporarily supporting said lateral walls of said trench, which means is in the form of a former, caisson or coffering having at least two rigid sides adjacent to said digging device, parallel to each other and each parallel to one lateral wall of said trench, and between which said device for substituting said collapsible means is disposed.

11. Apparatus according to claim 8, wherein said device comprises an expansion device for an expansible member placed in contracted or compressed state in said trench by a conveying device.

12. Apparatus according to claim 11, in combination with said collapsible means, wherein said expansion device comprises a diverging cone at the entrance of which said expansible member is in said compressed or contracted state.

13. Apparatus according to claim 11, wherein said expansion device comprises a device for pumping and injecting a fluid under pressure into an expansible member formed by an envelope which is made of a supple and deformable substance and is conveyed by the conveying device into the trench in a state folded or coiled upon itself.

14. Apparatus according to claim 13, wherein said expansion device further comprises a spreader, and said device for pumping and injecting liquid under pressure opens out into said diverging cone.

15. Apparatus according to claim 13, in combination with said envelope, wherein said envelope is held folded or coiled upon itself in breakable ligature means before entry into said expansion device.

16. Apparatus according to claim 14, further comprising a device for transverse pinching of the envelope at the exit of said expansion device.

17. Apparatus according to claim 13, in combination with said envelope wherein said envelope is in the form of a sleeve having a substantially cylindrical cross-section in the unfolded state.

18. A combination according to claim 17, wherein said envelope is segmented into longitudinal compartments.

19. Apparatus according to claim 13, in combination with said envelope, wherein said envelope is in the form of a series of bellows, compressed longitudinally and disposed in a string into said expansion device and into said trench where they are unfolded.

20. A combination according to claim 17, wherein said device for pumping and injecting communicates with said envelope centrally.

21. Apparatus according to claim 13, wherein said expansion device comprises at least two diverging lips for separating two adjacent lateral edges of said envelope and between which said device for pumping and injecting opens out.

22. Apparatus according to claim 13, wherein said expansion device comprises a device for opening an envelope having interlocked lateral edges, said opening device being provided with at least two diverging lips for separating said edges between which said device for pumping and injecting opens out, and means for the release of said interlocked lateral edges.

23. Apparatus according to claim 21, wherein said expansion device also comprises at least two converging lips for bringing together the edges separated by said diverging lips facing one wall of said trench.

24. Apparatus according to claim 22, wherein said expansion device also comprises a device for interlocking the edges separated by said diverging lips.

25. Apparatus according to claim 13, in combination with said envelope, wherein free orifices for allowing a flow of escaping liquid under pressure out of said envelope are distributed regularly along said envelope.

* * * * *